(12) United States Patent
Puotkalis

(10) Patent No.: US 11,946,535 B2
(45) Date of Patent: Apr. 2, 2024

(54) CLAMP BUILDING BLOCK DIFFERENTIAL

(71) Applicant: DOUBLEEAGLE INDUSTRY (CHINA) LIMITED, Hongkong (CN)

(72) Inventor: Martynas Puotkalis, Vilnius (LT)

(73) Assignee: DOUBLEEAGLE INDUSTRY (CHINA) LIMITED, Hongkong (CN)

( * ) Notice: Subject to any disclaimer, the term of this patent is extended or adjusted under 35 U.S.C. 154(b) by 0 days.

(21) Appl. No.: 18/226,661

(22) Filed: Jul. 26, 2023

(65) Prior Publication Data
US 2024/0052919 A1 Feb. 15, 2024

(30) Foreign Application Priority Data

Aug. 14, 2022 (CN) .............................. 202221314210
Mar. 8, 2023 (DE) ...................... 10 2023 105 776.6

(51) Int. Cl.
*F16H 48/40* (2012.01)
*A63H 17/26* (2006.01)
*F16H 48/08* (2006.01)

(52) U.S. Cl.
CPC ........... *F16H 48/40* (2013.01); *A63H 17/262* (2013.01); *F16H 48/08* (2013.01); *F16H 2048/085* (2013.01)

(58) Field of Classification Search
CPC .... F16H 48/40; F16H 48/08; F16H 2048/085; A63H 17/26
See application file for complete search history.

(56) References Cited

U.S. PATENT DOCUMENTS

| 5,507,702 | A | * | 4/1996 | Joachim | ................... | F16H 48/22 475/236 |
| 5,938,558 | A | * | 8/1999 | Eybergen | ................ | F16H 48/22 403/375 |
| 6,254,505 | B1 | * | 7/2001 | Forrest | .................... | F16H 48/30 475/230 |
| 11,703,114 | B2 | * | 7/2023 | Nguyen | .................. | F16H 48/40 475/331 |

FOREIGN PATENT DOCUMENTS

WO 2021074282 A1 4/2021

* cited by examiner

*Primary Examiner* — Tisha D Lewis

(57) ABSTRACT

A clamp building block differential (2) includes a differential cage (10) extending in a longitudinal direction (4), a transverse direction (6) transverse to the longitudinal direction (4), and a vertical direction (8) transverse to the longitudinal direction (4) and transverse to the transverse direction (6), having a cage bottom (12) extending in the longitudinal direction (4) and the transverse direction (6) from which a first cage wall (14) and a second cage wall (16) extend in the vertical direction (8) and which are spaced apart from one another in the transverse direction (6), and including a cage column (18) which extends in the vertical direction (8) and which is held on the cage walls (14, 16).

13 Claims, 6 Drawing Sheets

CLAMP BUILDING BLOCK DIFFERENTIAL

CROSS-REFERENCE TO RELATED APPLICATIONS

This application claims priorities from the Chinese patent application 202221314210 filed Aug. 14, 2022, and from German patent application 10 2023 105 776.6, filed Mar. 8, 2023, the content of which are incorporated herein in the entirety by reference.

TECHNICAL FIELD

The present invention relates to a clamp building block differential pursuant to the preamble of the claim 1.

BACKGROUND

Such a clamp building block differential is known from WO 2021/074282 A1.

SUMMARY

It is the object of the invention to improve the known clamp building block differential.

The task is fulfilled by the characteristics of the independent claims. Preferred embodiments are the subject matter of the dependent claims.

In accordance with an aspect of the invention, a clamp building block differential includes a differential cage extending in a longitudinal direction, a transverse direction transverse to the longitudinal direction, and a vertical direction transverse to the longitudinal direction and transverse to the transverse direction, having a cage bottom extending in the longitudinal direction and the transverse direction from which a first cage wall and a second cage wall extend in the vertical direction and which are spaced apart from one another in the transverse direction, and having a cage column which extends in the vertical direction and which is held on the cage walls, a first sun wheel placed on the cage bottom and designed to drive a first output shaft through the cage bottom, a planetary wheel engaged with the first sun wheel, a cover which is held on the cage walls opposite to the cage bottom in the vertical direction and a second sun wheel held between the cage column and the cover and engaged with the planetary wheel and which is designed to drive a second output shaft through the cover, wherein the planetary wheel is held on a pivot bearing of the cage column and can be rotated on it.

The specified clamp building block differential is based on the consideration that the loose insertion of planetary wheels in the known clamp building block differential requires either at least three planetary wheels or very complex stabilization measures, such as the insertion of additional walls.

Based on this consideration, the present clamp building block differential proposes to relocate the guidance of the planetary wheels in their center of rotation. In this way, the clamp building block differential can basically be formed with just a single planetary wheel without the need for further stabilization measures.

In an embodiment of the specified clamp building block differential, the pivot bearing is designed as a plain bearing. In this way, the clamp building block differential can be constructed in a space-saving, cost-effective and simple manner.

In another embodiment of the specified clamp building block differential, the pivot bearing comprises a bearing axle onto which the planetary wheel is slid axially. The embodiment is based on the consideration that in the known clamp building block differential, the planetary wheels must be guided on guide elements in the walls, which are designed as slots, for example. These slots cause friction. If the clamp building block differential is then used in high-speed applications, this can significantly reduce the service life. With the bearing axle designed as a pivot bearing, friction can be reduced significantly so that the specified clamp building block differential is particularly durable in high-speed applications.

In an additional embodiment of the specified clamp building block differential, the bearing axle has a positive locking element opposite the cage column, which blocks an axial movement of the planetary wheel away from the cage wall in at least one rotational position of the planetary wheel and permits it in at least one other rotational position of the planetary wheel. In this way, the planetary wheel can be fixed axially when the specified clamp building block differential is in the process of being assembled, which noticeably simplifies their assembly.

In yet another embodiment, the specified clamp building block differential comprises a further planetary wheel being meshed with the first sun wheel, which can be rotated on a further pivot bearing of the cage column. In this way, drive forces in the gear can be distributed over several gear elements, which leads to a noticeable increase in service life.

In a particular embodiment of the specified clamp building block differential, the pivot bearing and the further pivot bearing are arranged symmetrically to the cage column. In this way, the drive forces are distributed symmetrically to the two planetary wheels, whereby a risk of tilting of the two planetary wheels is significantly reduced.

In a further embodiment of the specified clamp building block differential, a first cover wall and a second cover wall extending from the cover counter to the vertical direction are spaced apart from one another in the longitudinal direction. The cage walls are held guided in the vertical direction between the first cover wall and the second cover wall. The two cover walls stabilize the cage walls transverse to the vertical direction, making the specified clamp building block differential much more robust.

In a preferred embodiment of the specified clamp building block differential, at least one of the cover walls has a slot running in the vertical direction, in which at least part of the pivot bearing can be inserted in the vertical direction. In this way, the previously explained stabilization of the clamp building block differential transverse to the vertical direction is further improved.

In a particularly preferred embodiment of the specified clamp building block differential, the slot has a slot end as seen in the vertical direction, whereby a mechanical load is applied to the slot end by the pivot bearing. In this way, the clamp building block differential is placed under a mechanical tension, whereby tolerances are compensated and unintentional play is avoided.

In a still further embodiment of the specified clamp building block differential, the cover walls are connected to the cage walls transversely to the vertical direction with a lapping. In this way, a contact area between the cage walls and the cover walls is increased, which once again significantly increases the stability of the clamp building block differential.

BRIEF DESCRIPTION OF THE DRAWINGS

The above-described properties, features and advantages of this invention, as well as the manner in which they are achieved, will become clearer in connection with the following description of the embodiments, which are explained in more detail in connection with the drawing, in which.

DETAILED DESCRIPTION

In the figures, the same technical elements are provided with the same reference signs, and are only described once. The figures are purely schematic and, in particular, do not reflect the actual geometric proportions.

Figure 1:
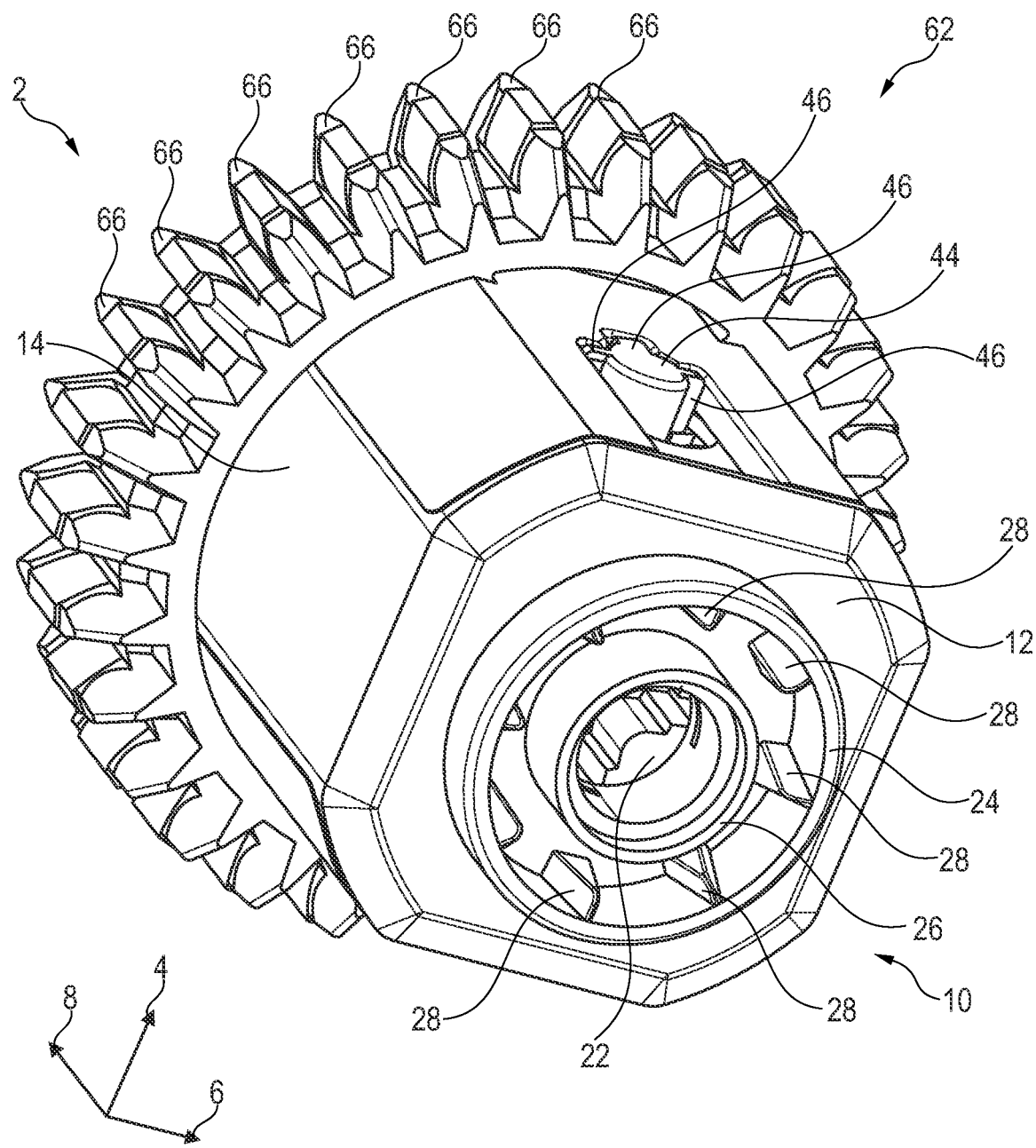
FIG. 1 shows a clamp building block differential from a first perspective.
Figure 2:
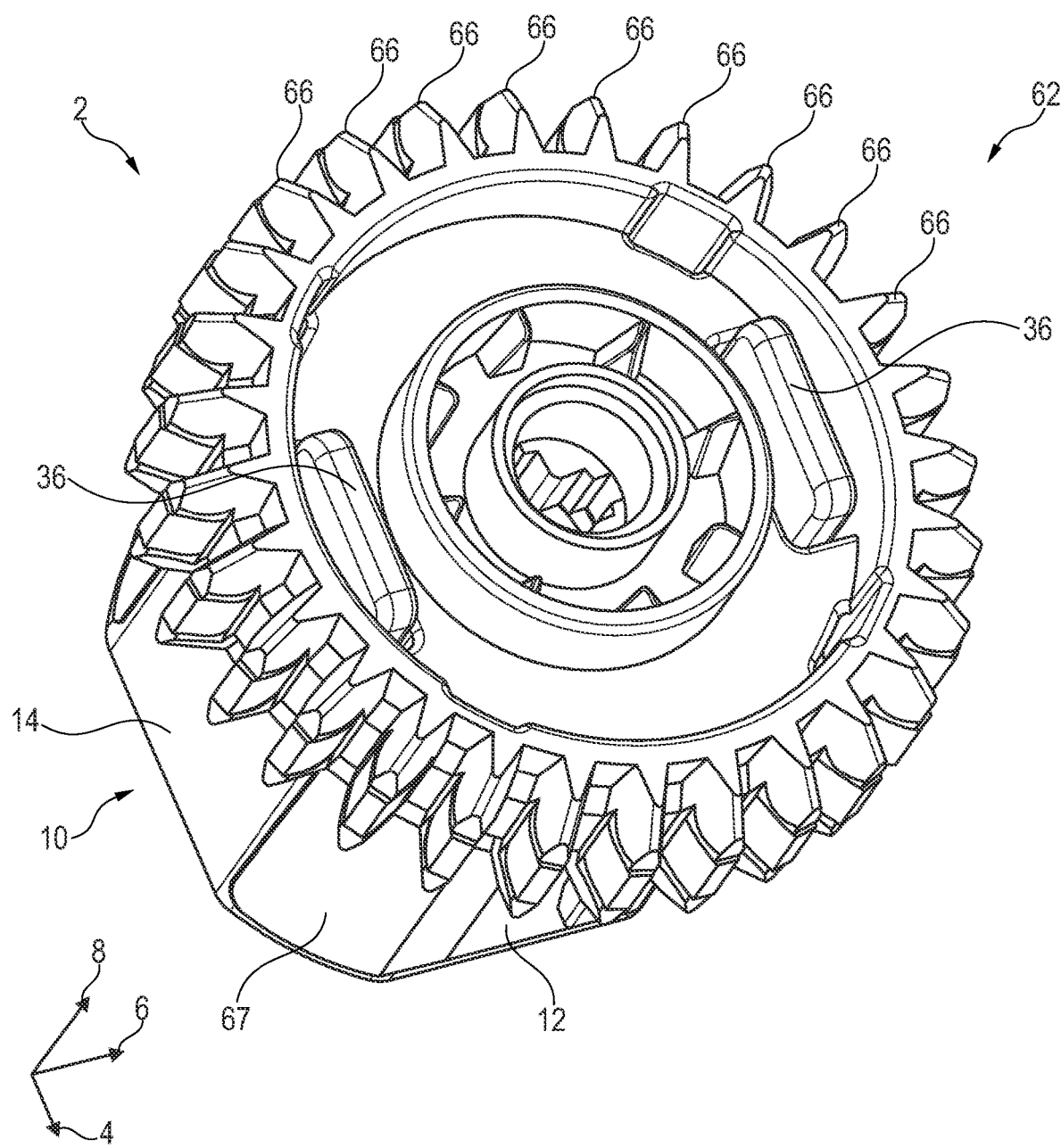
FIG. 2 shows the clamp building block differential from FIG. 1 from a second perspective.
Figure 3:
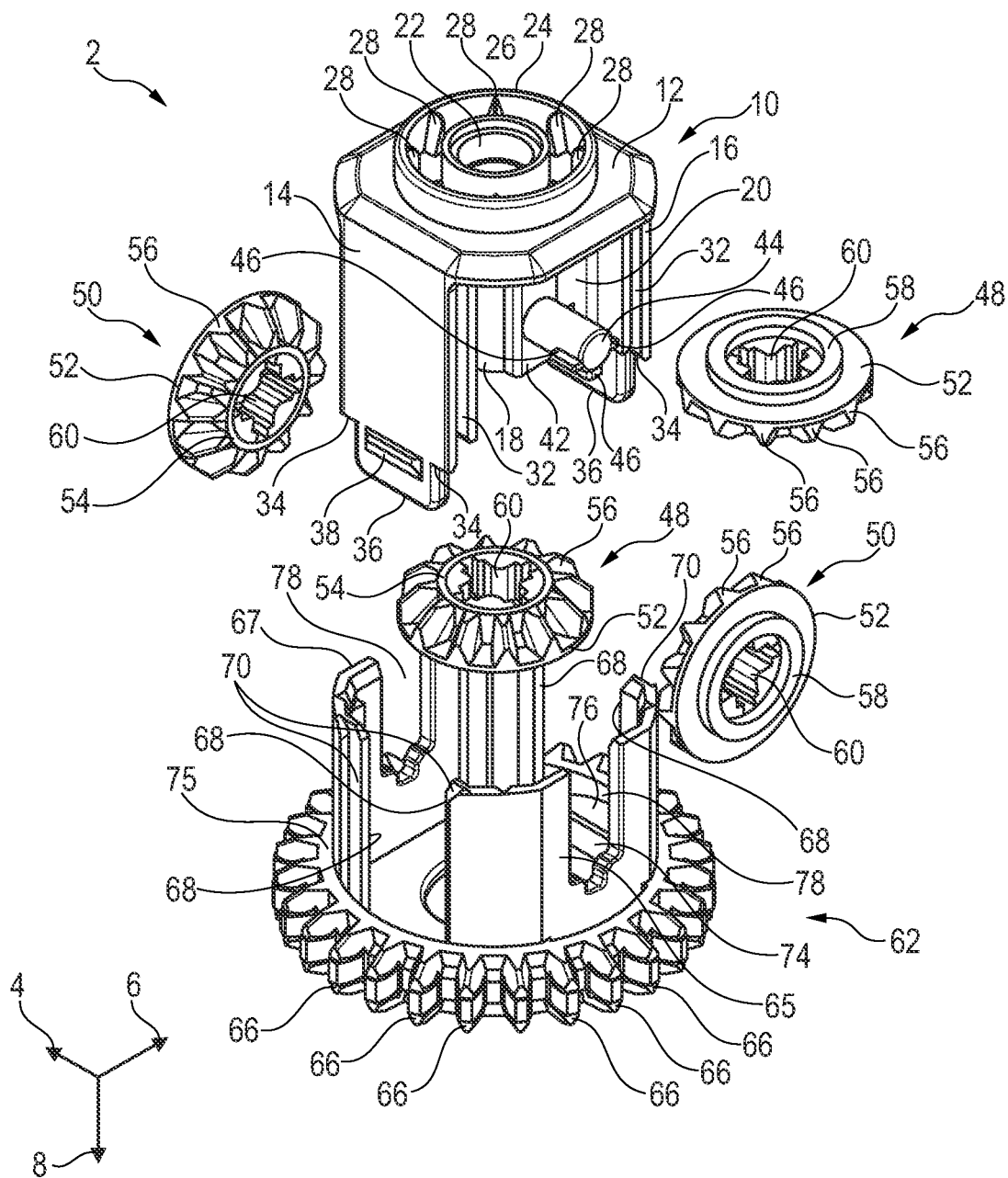
FIG. 3 shows the clamp building block differential from FIGS. 1 and 2 in an exploded view.
Figure 4:
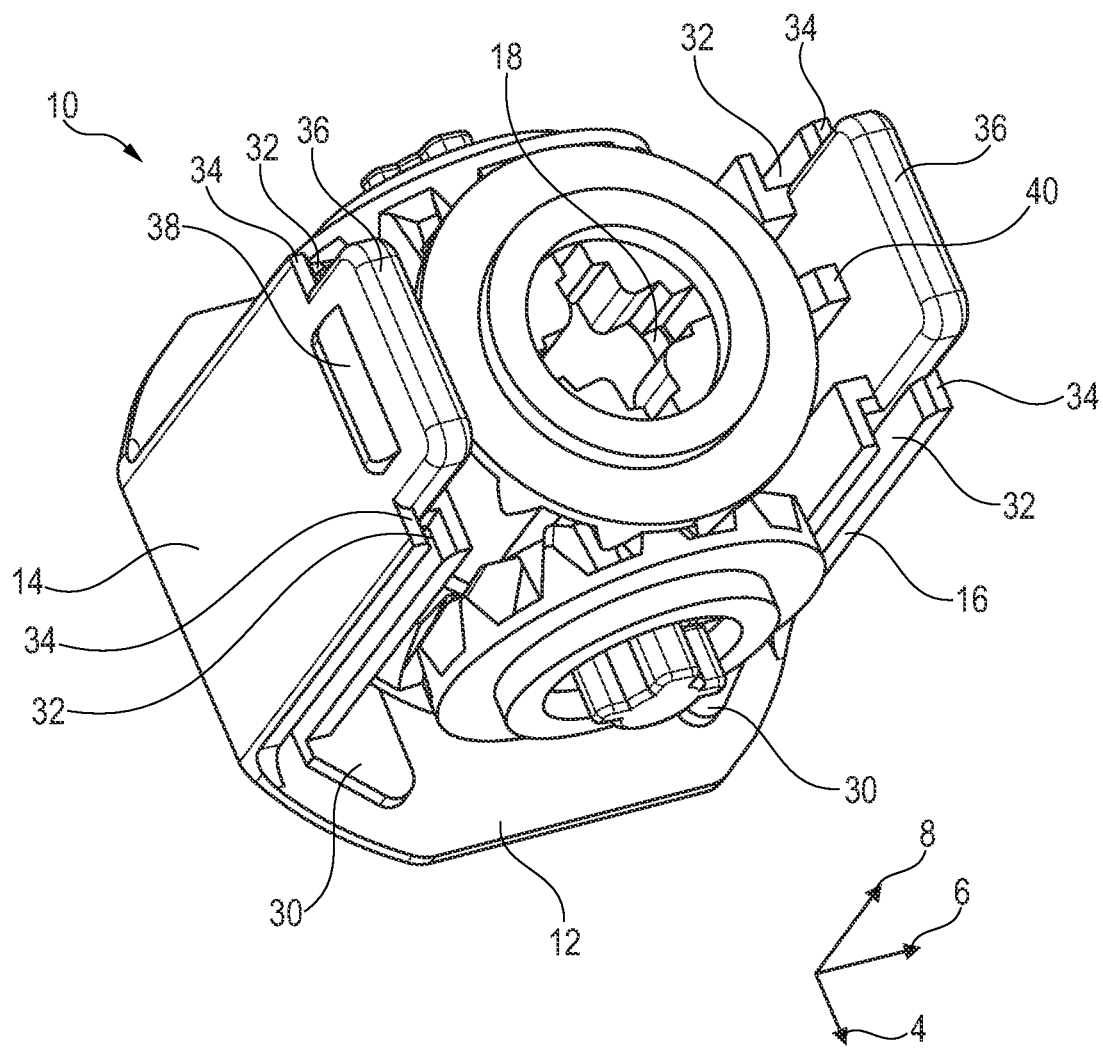
FIG. 4 shows a cage of the clamp building block differential from FIGS. 1 to 3, in which planetary wheels and sun wheels are inserted.

Reference is made to FIGS. 1 to 3, which show a clamp building block differential 2 from two different perspectives and in an exploded view. A differential gear, also called a differential for short, is a special planetary gear, also called epicyclic gear train, with one drive and two outputs.

Figure 5:
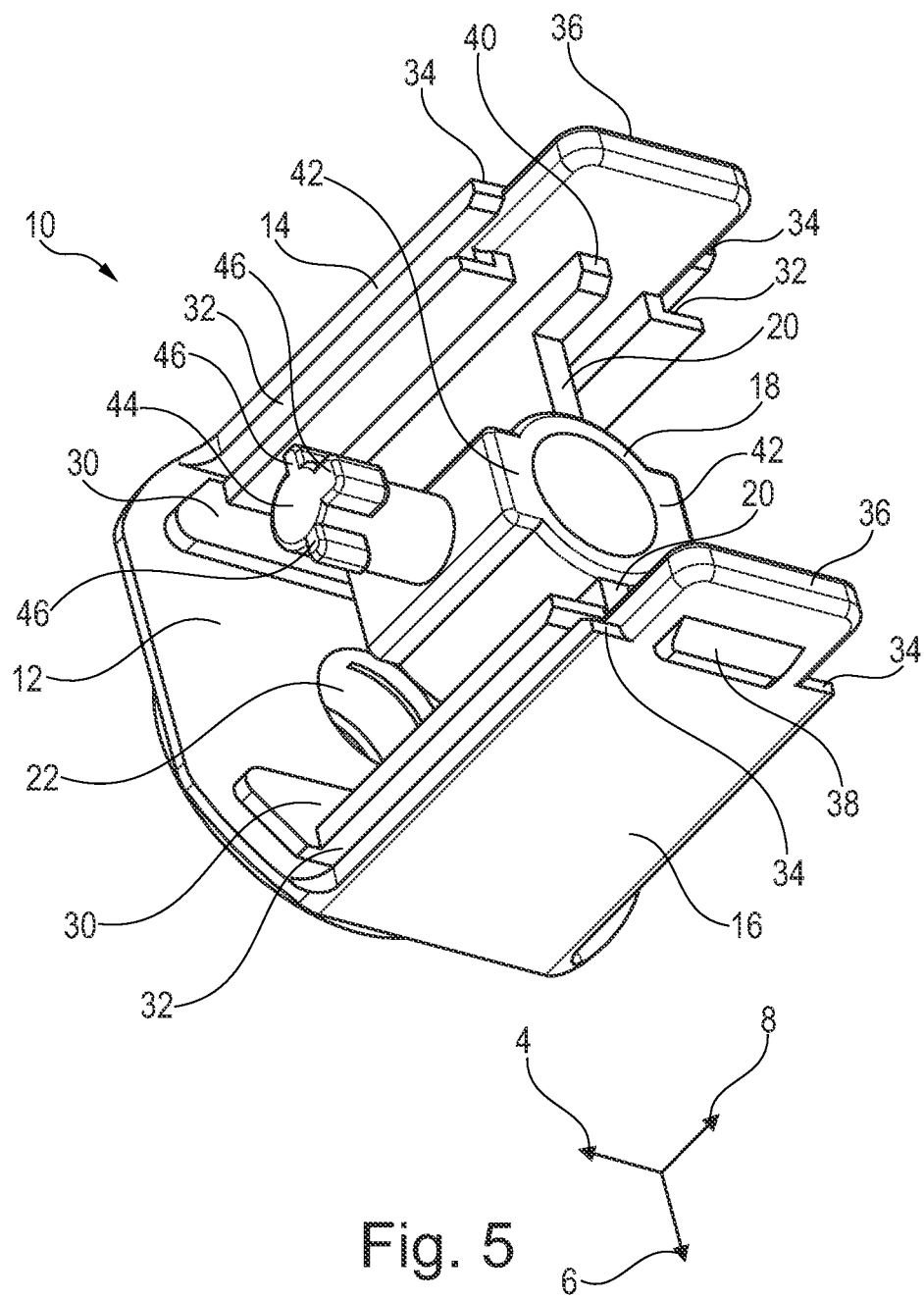
FIG. 5 shows the cage of the clamp building block differential from FIG. 3, without the planetary wheels and sun wheels.

The clamp building block differential 2 comprises a differential cage 10 extending in a longitudinal direction 4, a transverse direction 6 transverse to the longitudinal direction 4, and a vertical direction 8 transverse to the longitudinal direction 4 and transverse to the transverse direction 6. The differential cage 10 serves in a planetary gear as a carrier of the planetary wheels, which will be discussed in more detail later. It is shown in isolation in FIG. 5 and comprises a cage bottom 12 extending in the longitudinal direction 4 and the transverse direction 6, from which a first cage wall 14 and a second cage wall 16 extend in the vertical direction 8 and which are spaced apart in the transverse direction 6. Furthermore, the differential cage 10 comprises a cage column 18 extending in the vertical direction 8 and held to the cage walls 14, 16 by connecting walls 20.

A first output opening 22 is guided through the cage bottom 12, through which a first output shaft, which is not shown further, can be introduced into an interior space of the clamp building block differential 2. From the underside of the cage bottom 12 when viewed in the vertical direction 8, an axial spacer element extends from an outer axial spacer ring 24 arranged concentrically around the first output opening 22 and an inner axial spacer ring 26, the outer axial spacer ring being stabilized with radial supporting elements 28. For the sake of clarity, not all these radial supporting elements 28 are given their own reference signs.

Two guide plates 30, spaced apart in the transverse direction 6, are formed on the upper side of the cage bottom 12 when viewed in the vertical direction 8 for a transverse guide, which will be discussed in more detail later. On an outer side when viewed from the output opening 22, the first cage wall 14 adjoins a guide plate 30 against the transverse direction 6 and the second cage wall 16 adjoins another guide plate 30 in the transverse direction 6. A guide slot 32 is formed on each outer edge of each cage wall 14, 16 when viewed in and against the longitudinal direction 4, which will be discussed in more detail later. In total, the differential cage 10 thus comprises four guide slots 32.

Each outer edge of each cage wall 14, 16 when viewed in and against the longitudinal direction 4 terminates at its upper side with a stop shoulder 34 when viewed in the vertical direction 8. An insertion tongue 36 adjoins each cage wall 14, 16 in the vertical direction 8 between the stop shoulders 34, whereby a catch hook 38 is formed on the outside of each insertion tongue 36 when viewed from the output opening 22.

Each connecting wall 20 comprises a guide shoulder 40 on its outer side when viewed from the output opening 22. The areas of each connecting wall 20 that do not belong to the respective guide shoulder 40 are at maximum the same vertical in the vertical direction 8 as the cage column 18, thus forming a bearing surface. In the present embodiment, the cage column 18, when viewed in the vertical direction 8, is formed higher than the areas of each connecting wall 20 that do not belong to the respective guide shoulder 40 in order to compensate for manufacturing tolerances.

The cage column 18 has a fastening projection 42 on each of its front and rear sides, when viewed in the longitudinal direction 4, which are each adjoined by a pivot bearing in the form of a bearing axle 44. The two bearing axles 44 are arranged symmetrically to one another with respect to the cage column 18. Each bearing axle 44 comprises three positive locking elements 46 opposite the cage column 18, which are arranged at an angle of 90° to one another and spaced apart on the outer surface of the bearing axle 44.

A gearwheel can be placed on the cage bottom 12 as sun wheel 48, which is arranged to drive the output shaft passing through the output opening 22. Several gearwheels are used in the clamp building block differential 2 as sun wheels 48 and planetary wheels 50, all of which are identical in construction. Their design is shown in detail in FIG. 3 and will be explained in more detail below.

The gearwheels 48, 50 are conical gearwheels and have a circular gear carrier plate 52 with an upper side which is not further referenced and a lower side which is not further referenced opposite the upper side. A supporting ring 54 extends at a right angle from the upper side of the gear carrier plate 52. Equidistant conical teeth 56 are arranged circumferentially around the supporting ring 54 between the gear carrier plate 52 and the supporting ring 54, only some of which are provided with their own reference signs for the sake of clarity. A spacer ring 58 extends from the underside of the gear carrier plate 52. Between the spacer ring 58 and the supporting ring 54, a cross-shaped bearing opening 60 is guided through the gear carrier plate 52.

Figure 6:
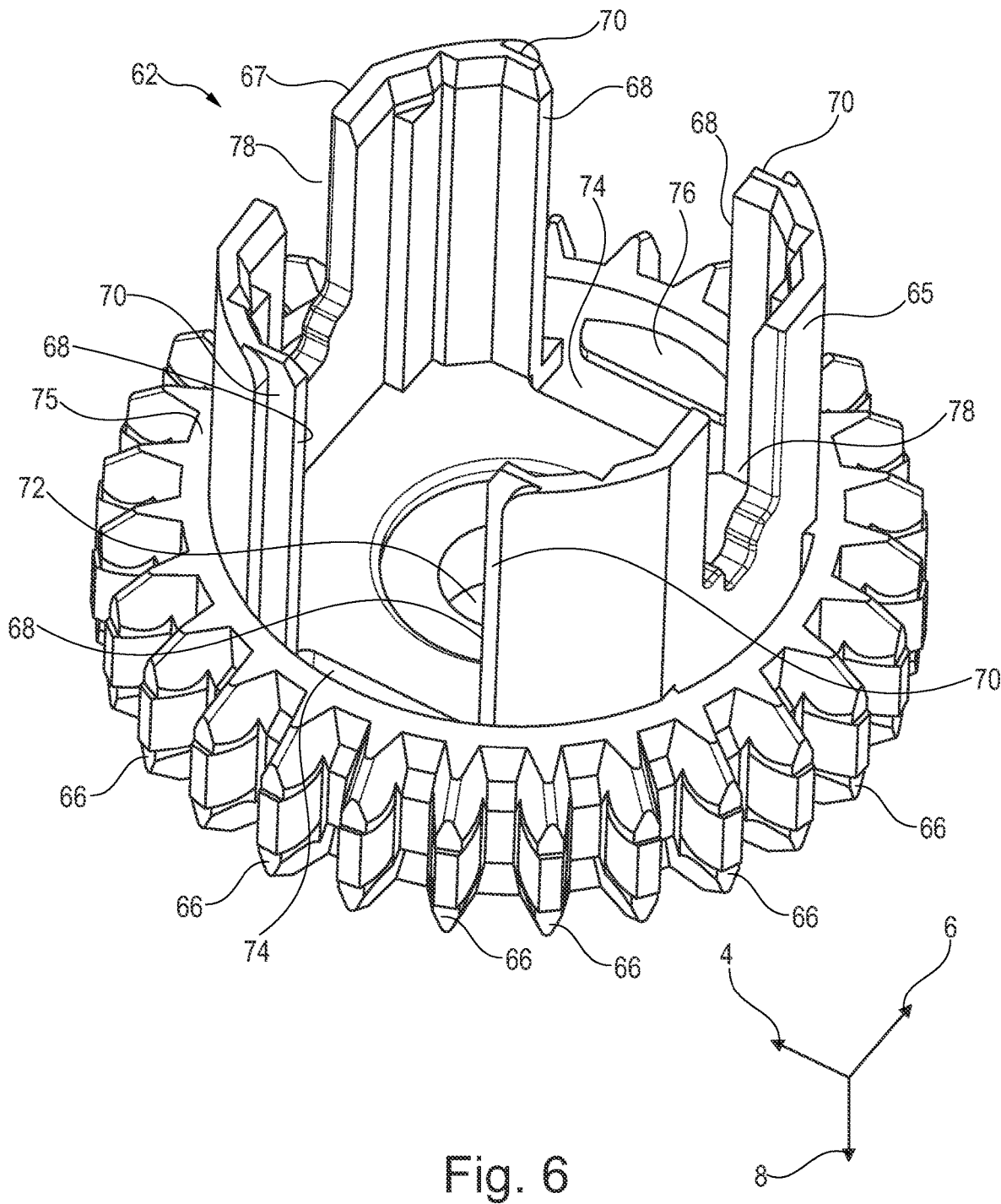
FIG. 6 shows a cover of the clamp building block differential from FIGS. 1 to 3.

The differential cage 10 can be closed with a cover 62, which is shown in detail in FIG. 6. The cover 62 has a circular cover plate 64, on the circumference of which a rim 75 with outwardly directed spur wheel teeth 66 is formed. For the sake of clarity, not all these spur wheel teeth 66 are given their own reference signs.

Like the differential cage 10, the cover 62 also comprises a first cover wall 65 and a second cover wall 67, but these are spaced apart from each other in the longitudinal direction 4 and their end edges 68 are directed towards each other. These end edges are formed in such a way that they can be pushed into the guide slots 32 of the differential cage 10. The cover walls 65, 66 are formed with a step 70 at the guide slots 32, so that when the cover walls 65, 67 are pushed into the guide slots 32 of the differential cage 10, a lapping is formed.

A second output opening 72 is also guided through the cover 62, through which a second output shaft, which is not shown further, can be introduced into the interior space of the clamp building block differential 2. Insertion openings 74 are also formed on the front side and the rear side of the cover 62, when viewed in the transverse direction 6, into which the insertion tongues 36 can be pushed in. In addition, catch hook receptacles 76 are formed in the rim 75, in which the catch hooks 38 can be latched.

Between the end edges 68, insertion slots 78 are formed in the cover walls 65, 67 running in the vertical direction 8, in which the bearing axles 44 can be received. For receiving the positive locking elements 46, the insertion slots 78 comprise corresponding recesses at their ends when viewed in the height direction 8, which are not provided with their own reference sign in the figures.

To assemble the clamp building block differential 2, first the planetary wheels 50 are slid onto the bearing axles 44 and twisted slightly so that the positive locking elements 44 prevent the planetary wheels 50 from accidentally slipping out of the bearing axles 44. A sun wheel 58 with its spacer ring 58 is then inserted onto the cage bottom 12 between the guide plates 30, while another sun wheel 58 is placed onto the cage column 18 between the two guide shoulders 40. Finally, the cover 62 with its two cover walls 65, 67 is placed on the differential cage 10 in such a way that the end edges 68 of the cover walls 65, 67 are inserted into the guide slots 32 of the cage walls 14, 16. As soon as the catch hooks 38 of the insertion tongues 36 reach the catch hook receptacles 76, the catch hooks 38 latch therein and secure the cover 62 and the differential cage 10 against unintentional release.

Now, the clamp building block differential 2 can be used in a clamp building block model. For example, to build a vehicle model, suitable shafts can be passed through the two output openings 22, 72 and inserted into the sun wheels 50. A driving energy can then be applied to the clamp building block differential 2 via the spur wheel teeth 66. This driving energy is then distributed to the shafts in the output openings 22, 72 so that the vehicle model can perform cornering in a realistic manner in which the wheels can rotate at different speeds.

The invention claimed is:

1. Clamp building block differential (2), comprising:
    a differential cage (10) extending in a longitudinal direction (4), a transverse direction (6) transverse to the longitudinal direction (4), and a vertical direction (8) transverse to the longitudinal direction (4) and transverse to the transverse direction (6), having a cage bottom (12) extending in the longitudinal direction (4) and the transverse direction (6) from which a first cage wall (14) and a second cage wall (16) extend in the vertical direction (8) and which are spaced apart from one another in the transverse direction (6), and comprising a cage column (18) which extends in the vertical direction (8) and which is held on the cage walls (14, 16),
    a first sun wheel (48) placed on the cage bottom (12) and designed to drive a first output shaft through the cage bottom (12),
    a planetary wheel (50) engaged with the first sun wheel (48),
    a cover (62) which is held on the cage walls (14, 16) opposite to the cage bottom (12) in the vertical direction (8), and
    a second sun wheel (48) held between the cage column (18) and the cover (62) and engaged with the planetary wheel (50) and which is designed to drive a second output shaft through the cover (62),
    wherein the planetary wheel (50) is held on a pivot bearing (44) of the cage column (18) and can be rotated on it.

2. The clamp building block differential (2) according to claim 1, wherein the pivot bearing (44) is executed as a plain bearing.

3. The clamp building block differential (2) according to claim 1, wherein the pivot bearing (44) comprises a bearing axle onto which the planetary wheel (50) is slid axially.

4. The clamp building block differential (2) according to claim 3, wherein the bearing axle (44) has a positive locking element (46) opposite the cage column (18), which blocks an axial movement of the planetary wheel (50) away from the cage column (18) in at least one rotational position of the planetary wheel (50) and permits it in at least one other rotational position of the planetary wheel (50).

5. The clamp building block differential (2) according to claim 1, comprising a further planetary wheel (50) being meshed with the first sun wheel (48), which can be rotated on a further pivot bearing (44) of the cage column (18).

6. The clamp building block differential (2) according to claim 5, wherein the pivot bearing (44) and the further pivot bearing (44) are arranged symmetrically held with respect to the cage column (18).

7. The clamp building block differential (2) according to claim 1, wherein a first cover wall (65) and a second cover wall (67) extend from the cover (62) counter to the vertical direction (8) and which are spaced apart from one another in the longitudinal direction and between which the cage walls (14, 16) are held guided in the vertical direction.

8. The clamp building block differential (2) according to claim 7, wherein at least one of the cover walls (65, 67) comprises a slot (78) extending in the vertical direction (8) into which at least one portion of the pivot bearing (44) can be inserted in the vertical direction (8).

9. The clamp building block differential (2) according to claim 8, wherein the slot (78) comprises a slot end when viewed in the vertical direction and a mechanical load is applied to the slot end by the pivot bearing (44).

10. The clamp building block differential (2) according to claim 7, wherein the cover walls (65, 67) are connected to the cage walls (14, 16) transversely to the vertical direction (8) with a lapping (32, 70).

11. The clamp building block differential (2) according to claim 2, wherein the pivot bearing (44) comprises a bearing axle onto which the planetary wheel (50) is slid axially.

12. The clamp building block differential (2) according to claim 8, wherein the cover walls (65, 67) are connected to the cage walls (14, 16) transversely to the vertical direction (8) with a lapping (32, 70).

13. The clamp building block differential (2) according to claim 9, wherein the cover walls (65, 67) are connected to the cage walls (14, 16) transversely to the vertical direction (8) with a lapping (32, 70).

* * * * *